(12) United States Patent
Allard et al.

(10) Patent No.: US 12,038,340 B2
(45) Date of Patent: Jul. 16, 2024

(54) SENSOR ASSEMBLY FOR VACUUM INSULATED STRUCTURE

(71) Applicant: WHIRLPOOL CORPORATION, Benton Harbor, MI (US)

(72) Inventors: Paul Bennett Allard, Coloma, MI (US); Sunil Shivaji Ekshinge, Pune (IN); Dustin M. Miller, South Bend, IN (US); Omkar Mithari, Pune (IN); Abhay Naik, Stevensville, MI (US); Rafael Dutra Nunes, St. Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 163 days.

(21) Appl. No.: 17/552,526

(22) Filed: Dec. 16, 2021

(65) Prior Publication Data
US 2023/0194372 A1   Jun. 22, 2023

(51) Int. Cl.
*G01L 19/00* (2006.01)
*F25D 23/02* (2006.01)
*G01L 19/14* (2006.01)
*G01L 21/00* (2006.01)

(52) U.S. Cl.
CPC .......... *G01L 19/147* (2013.01); *F25D 23/028* (2013.01); *G01L 21/00* (2013.01); *Y10T 428/231* (2015.01)

(58) Field of Classification Search
None
See application file for complete search history.

(56) References Cited

U.S. PATENT DOCUMENTS

| | | | |
|---|---|---|---|
| 3,655,939 | A | 4/1972 | Stromquist |
| 8,449,177 | B2 | 5/2013 | Kvisteroy et al. |
| 9,321,237 | B2 | 4/2016 | Hiemeyer et al. |
| 10,781,963 | B2 | 9/2020 | Uekado et al. |
| 10,941,975 | B2 | 3/2021 | Choi et al. |
| 10,995,488 | B1 | 5/2021 | Allard et al. |
| 2020/0033049 | A1 | 1/2020 | Dherde et al. |
| 2020/0049586 | A1 | 2/2020 | Eschenbach et al. |
| 2020/0132243 | A1 | 4/2020 | Vaze et al. |
| 2020/0278149 | A1 | 9/2020 | Ekshinge et al. |
| 2021/0088403 | A1 | 3/2021 | Allard et al. |
| 2021/0148113 | A1 | 5/2021 | Allard et al. |

FOREIGN PATENT DOCUMENTS

| | | |
|---|---|---|
| DE | 10117021 A1 | 10/2002 |
| DE | 10159518 A1 | 6/2003 |
| EP | 3693649 A1 | 8/2020 |
| WO | 2012017903 A1 | 2/2012 |
| WO | 2019069531 A1 | 4/2019 |

*Primary Examiner* — Alexander S Thomas
(74) *Attorney, Agent, or Firm* — Price Heneveld LLP

(57) ABSTRACT

A door assembly includes a structural wrapper defining an insulating cavity. The structural wrapper defines a sensor port. A sensor assembly is coupled to an outer surface of the structural wrapper proximate to the sensor port. The sensor assembly includes a connector having a base coupled to a housing. The base is coupled to the structural wrapper. The connector defines an interior in fluid communication with the insulating cavity. A pressure sensor is disposed within the housing. The pressure sensor is configured to sense a pressure within the insulating cavity. At least one plate is disposed at an open end of the housing. The pressure sensor includes sensor pins that extend through the at least one plate.

20 Claims, 12 Drawing Sheets

SENSOR ASSEMBLY FOR VACUUM INSULATED STRUCTURE

BACKGROUND OF THE DISCLOSURE

The present disclosure generally relates to a sensor assembly, and more specifically, to a sensor assembly for a vacuum insulated structure.

SUMMARY OF THE DISCLOSURE

According to one aspect of the present disclosure, a door assembly includes a structural wrapper defining an insulating cavity. The structural wrapper defines a sensor port. A sensor assembly is coupled to an outer surface of the structural wrapper proximate to the sensor port. The sensor assembly includes a connector having a base coupled to a housing. The base is coupled to the structural wrapper. The connector defines an interior in fluid communication with the insulating cavity. A pressure sensor is disposed within the housing. The pressure sensor is configured to sense a pressure within the insulating cavity. At least one plate is disposed at an open end of the housing. The pressure sensor includes a sensor pin that extends through the at least one plate.

According to another aspect of the present disclosure, a vacuum insulated structure includes a structural wrapper defining an insulating cavity. The structural wrapper defines a sensor port in fluid communication with the insulating cavity. A sensor assembly is coupled to the structural wrapper. The sensor assembly extends over the sensor port. The sensor assembly includes a connector having a base coupled to the structural wrapper and a housing coupled to the base. An interior of the connector is in fluid communication with the insulating cavity via the sensor port. A pressure sensor is disposed within the housing. The pressure sensor is configured to sense a pressure within the insulating cavity.

According to yet another aspect of the present disclosure, a sensor assembly for a vacuum insulated structure includes a base defining a base interior. A housing defines a housing interior. The housing is coupled to the base. The base interior is in fluid communication with the housing interior via a connecting channel. A plate is coupled to an open end of the housing. A pressure sensor is disposed within the housing interior. The pressure sensor is configured to sense a pressure within said vacuum insulated structure.

These and other features, advantages, and objects of the present disclosure will be further understood and appreciated by those skilled in the art by reference to the following specification, claims, and appended drawings.

Figure 1:
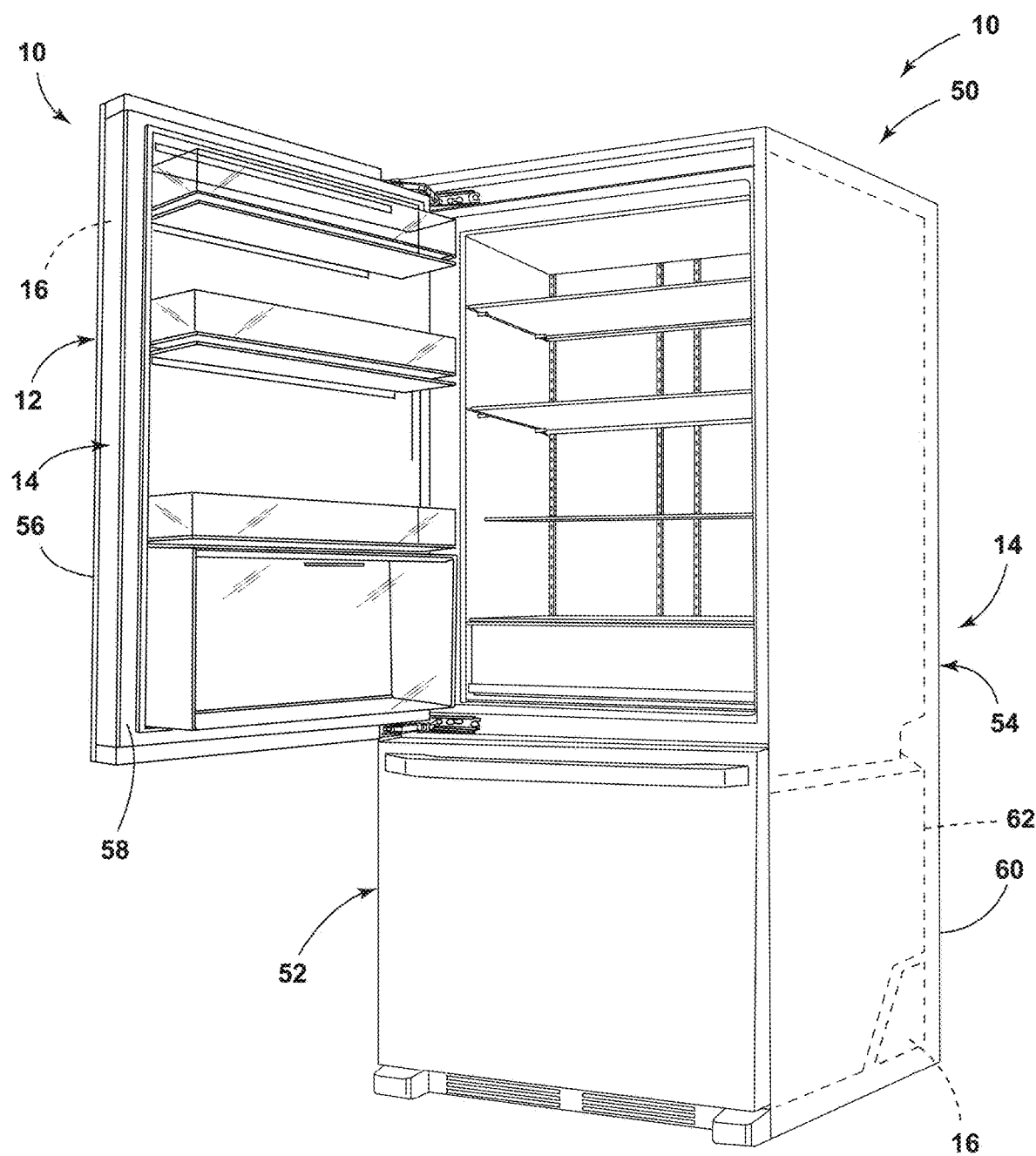
FIG. 1 is a side perspective view of a refrigerating appliance having an insulated cabinet and insulated doors, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a sensor assembly for a vacuum insulated structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-16, reference numeral 10 generally designates a vacuum insulated structure such as a door assembly or door 12 that includes a structural wrapper 14 defining an insulating cavity 16. The structural wrapper 14 defines a sensor port 18. A sensor assembly 20 is coupled to an outer surface 22 of the structural wrapper 14 proximate to the sensor port 18. The sensor assembly 20 includes a connector 24 having a base 26 coupled to a housing 28. The base 26 is coupled to the structural wrapper 14. The connector 24 defines an interior 30 in fluid communication with the insulating cavity 16. A pressure sensor 32 is disposed within the housing 28. The pressure sensor 32 is configured to sense a pressure within the insulating cavity 16. At least one plate 34 is disposed at an open end of the housing 28. The pressure sensor 32 includes sensor pins 36 that extend through the plate 34.

Figure 2:
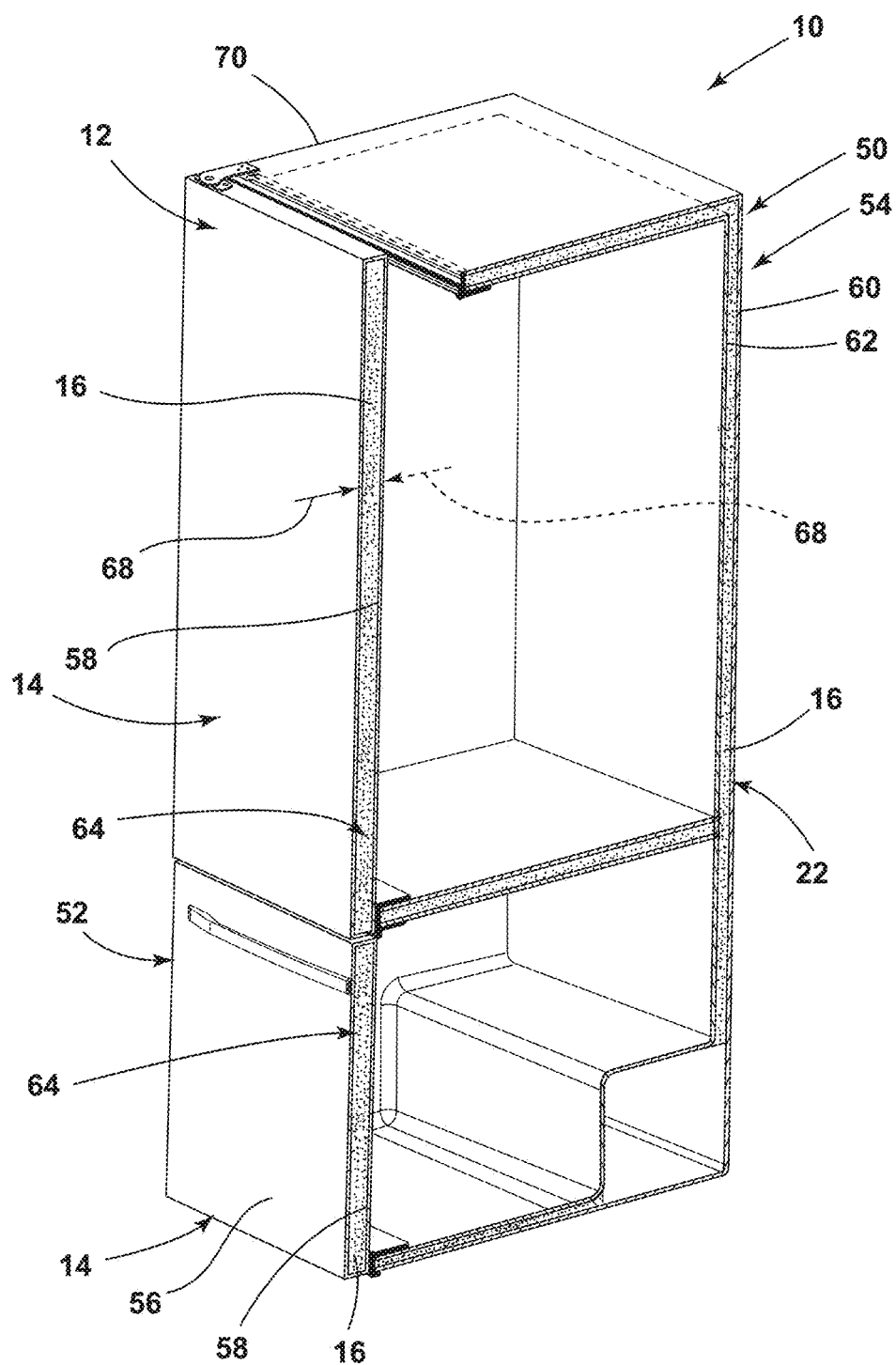
FIG. 2 is a perspective cross-sectional view of a vacuum insulated refrigerating appliance, according to the present disclosure.

Referring to FIGS. 1 and 2, the vacuum insulated structure 10 is generally illustrated as the door 12 for an appliance 50, such as the illustrated refrigerating appliance 50; however, it is contemplated that the door 12 disclosed herein may be used with a variety of appliances 50, structures, or insulation purposes other than with the appliance 50. Moreover, the illustrated refrigerating appliance 50 is a bottom mount refrigerator having the door 12 and a second door 52, which can have a substantially similar configuration as the door 12. The vacuum insulated structure 10 may be a rotationally and/or a laterally operable panel for doors 12 and drawers. In non-limiting examples, the refrigerating appliance 50 can be a bottom mount refrigerator, a bottom mount French door refrigerator, a top mount refrigerator, a side-by-side refrigerator, a four-door French door refrigerator, and/or a five-door French door refrigerator, each of which can have one or more doors 12, 52 and/or vacuum insulated structures 10.

As illustrated in FIGS. 1 and 2, there are two different configurations of the structural wrapper 14, which include the door 12 and a cabinet 54. The door 12 includes the structural wrapper 14 defining the insulating cavity 16 therebetween. In the door 12 configurations, the structural wrapper 14 may include an outer wrapper 56 coupled with an inner liner 58 that define the insulating cavity 16 therebetween. In the cabinet 54 configuration, the structural wrapper 14 may include a cabinet wrapper 60 and a cabinet liner 62 defining the insulating cavity 16 therebetween, thereby forming an exemplary vacuum insulated structure 10.

The insulating cavity 16 of the structural wrapper 14 typically includes one or more insulation materials 64 disposed therein. It is generally contemplated that the insulation materials 64 may be glass-type materials, carbon-based powders, silicon oxide-based materials, silica-based materials, insulating gasses, and other standard insulation materials 64. Additionally, the insulation materials 64 may be free-flowing materials that can be poured, blown, compacted, or otherwise disposed within the insulating cavity 16. This free-flowing material can be in the form of various silica-based materials, such as fumed silica, precipitated silica, nano-sized and/or micro-sized aerogel powder, rice husk ash powder, perlite, glass spheres, hollow glass spheres, cenospheres, diatomaceous earth, combinations thereof, and any other similar insulating particulate material. For example, in the door 12 configurations, the insulation materials 64 substantially fill the insulating cavity 16 forming a substantially continuous layer between the outer wrapper 56 and the inner liner 58. Similarly, in cabinet 54 examples, the insulation materials 64 substantially fill the insulating cavity 16 forming a substantially continuous layer between the cabinet wrapper 60 and the cabinet liner 62.

In the depicted example of FIGS. 1 and 2, the structural wrapper 14 of the vacuum insulated structure 10 may be made from a material at least partially resistant to bending, deformation, or otherwise being formed in response to an inward compressive force. These materials for the structural wrapper 14 include, but are not limited to, metals, polymers, metal alloys, combinations thereof, and/or other similar substantially rigid materials that can be used for vacuum insulated structures 10.

Referring still to FIGS. 1 and 2, an at least partial vacuum is defined within the insulating cavity 16. The at least partial vacuum defines a pressure differential 68 between an exterior 70 of the vacuum insulated structure 10 and the insulating cavity 16. The at least partial vacuum establishes a less-than-atmospheric pressure within the insulating cavity 16. The term "atmospheric pressure" is intended to refer to the pressure exerted by the weight of the atmosphere, which at sea level has a mean value of 101,325 Pascals. The pressure differential 68 serves to define the inward compressive force that is exerted on the structural wrapper 14 and tends to bias the outer wrapper 56 or the cabinet wrapper 60 and the inner liner 58 or the cabinet liner 62 toward the insulating cavity 16, depending on the configuration of the vacuum insulated structure 10. Over time, gas can infiltrate into the insulating cavity 16 from an area outside the door 12, 52 or the appliance 50, which can diminish the at least partial vacuum. The infiltration of gas is sometimes referred to as gas permeation, which can result in the at least partial vacuum decreasing over time.

Figure 3:
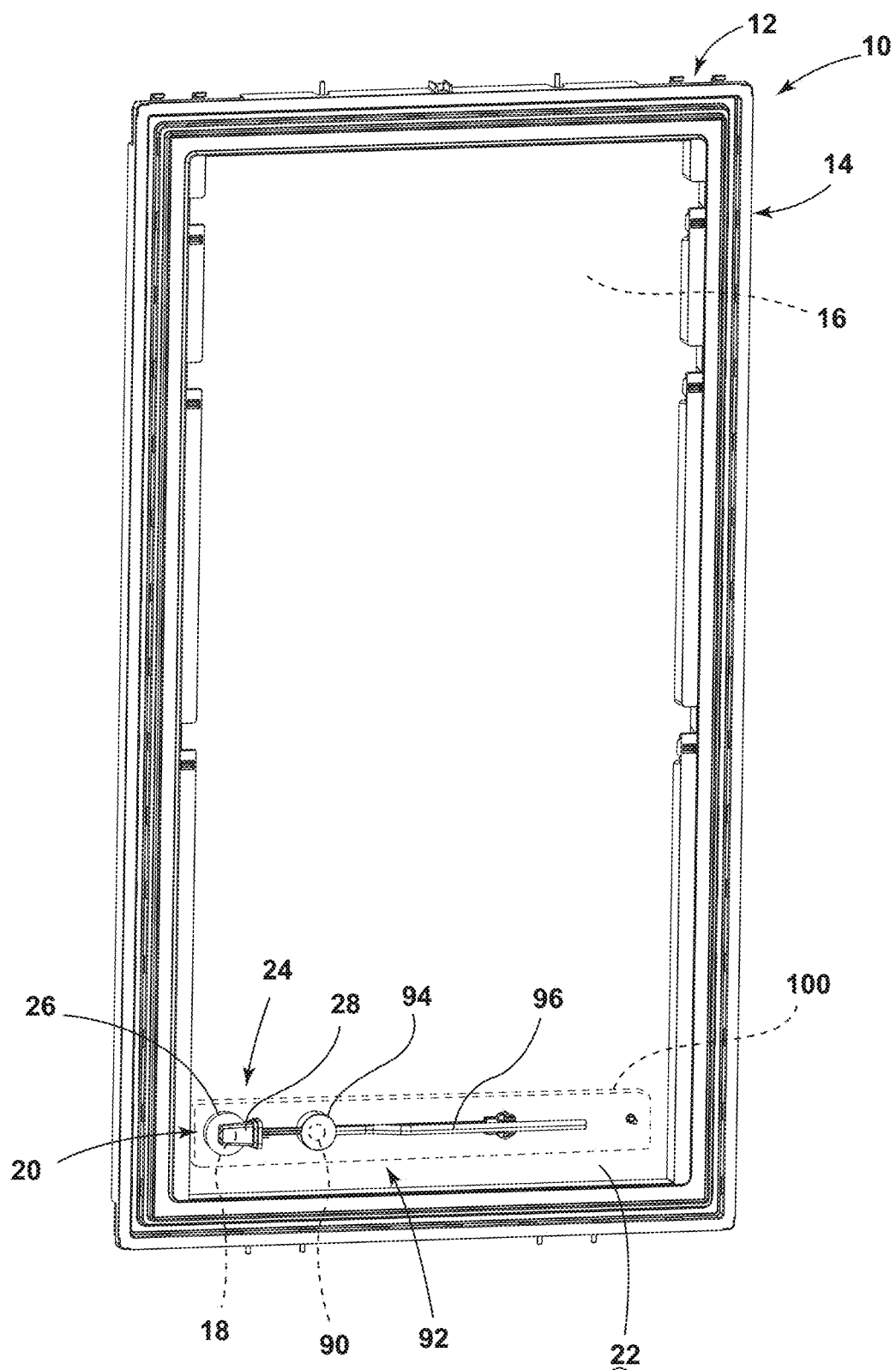
FIG. 3 is a front plan view of a vacuum insulated structure configured as a door having an evacuation port assembly and a sensor assembly, according to the present disclosure.
Figure 4:
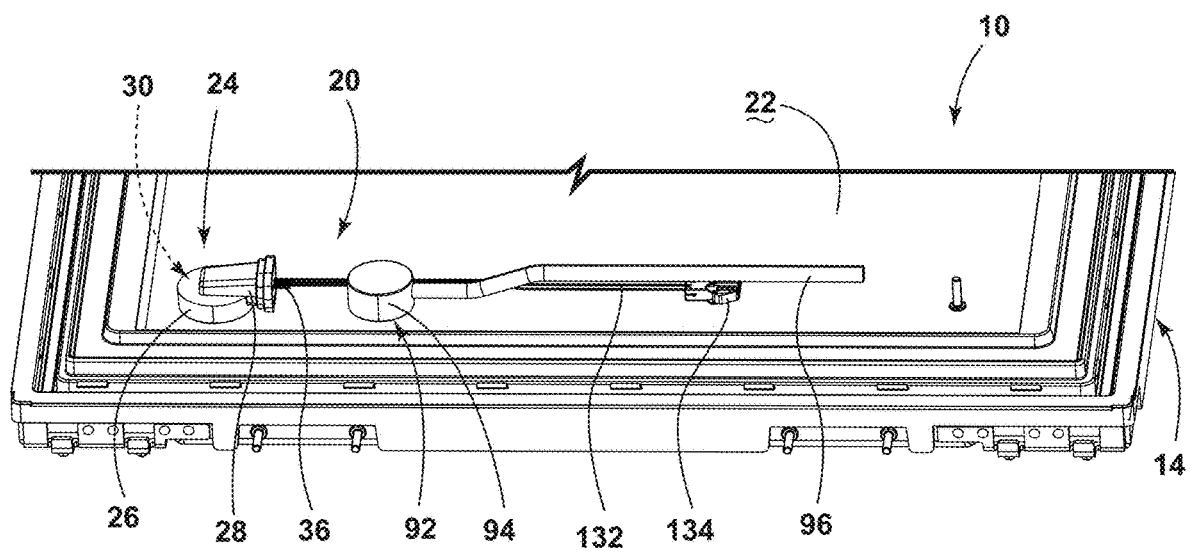
FIG. 4 is a partial front perspective view of a sensor assembly and an evacuation port assembly coupled to a structural wrapper, according to the present disclosure.
Figure 5:
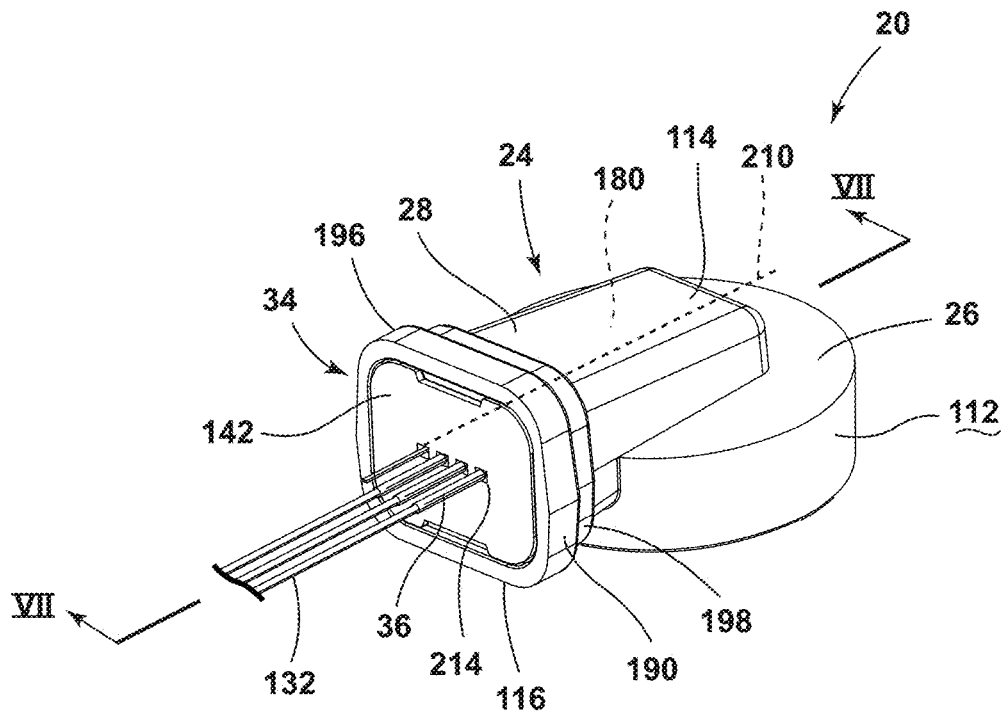
FIG. 5 is a partial side perspective view of a sensor assembly, according to the present disclosure.
Figure 6:
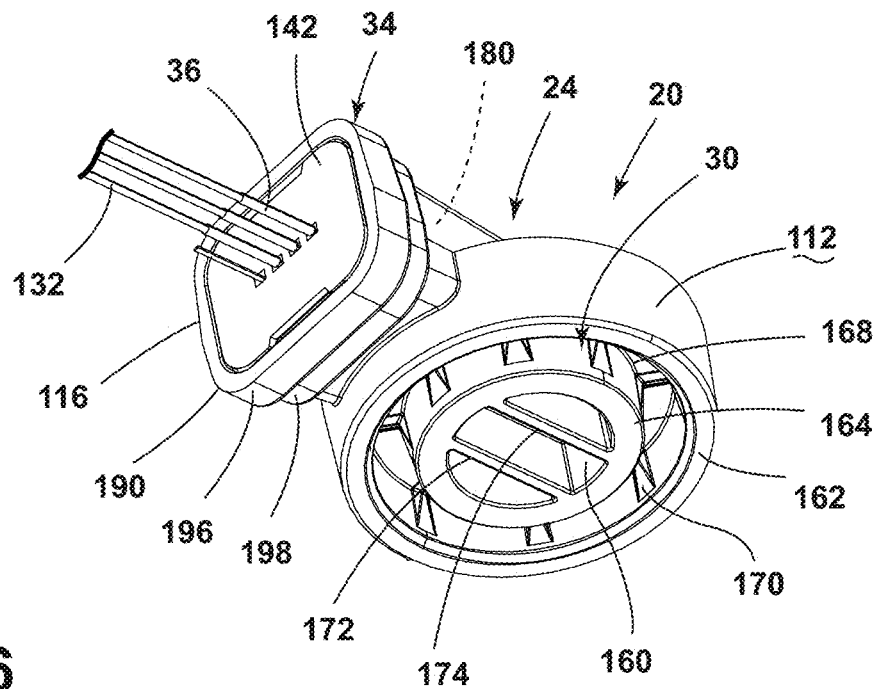
FIG. 6 is a partial bottom perspective view of a sensor assembly, according to the present disclosure.
Figure 7:
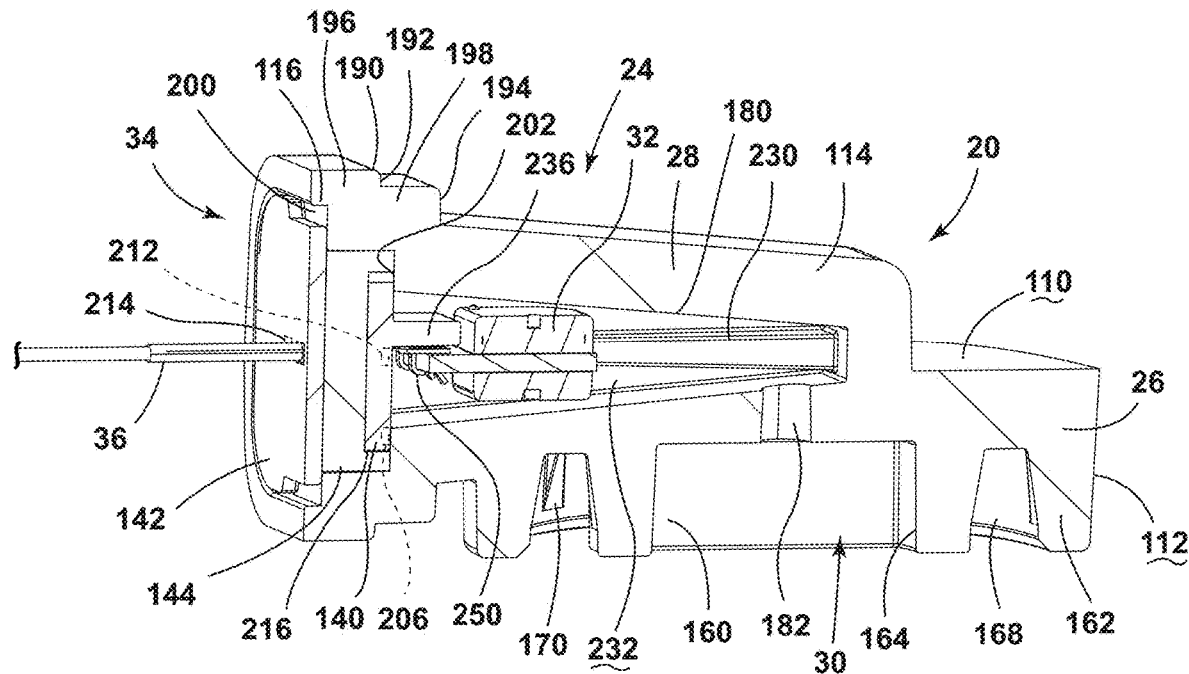
FIG. 7 is a partial cross-sectional view of the sensor assembly of FIG. 6, taken along line VII-VII, according to the present disclosure.

Referring to FIGS. 3 and 4, the structural wrapper 14 defines an evacuation port 90, which is an opening into the insulating cavity 16. The at least partial vacuum is typically defined by evacuation of fluid from the insulating cavity 16 through the evacuation port 90 via an evacuation port assembly 92. The evacuation port assembly 92 typically includes a coupling structure 94 to engage the structural wrapper 14 and a servicing tube 96 to expel gas. The evacuation port assembly 92 is in fluid communication with the insulating cavity 16 via the evacuation port 90 to expel gas from the insulating cavity 16 via the servicing tube 96.

In FIGS. 3 and 4, the sensor assembly 20 is illustrated on the door 12. However, it is contemplated that the sensor assembly 20 may be utilized with any vacuum insulated structure 10, such as the cabinet 54, the doors 12, 52, other panels, etc. Further, the present disclosure is not limited to refrigerators or refrigerated appliances 50. The appliance 50 may be, for example, freezers, coolers, ovens, dishwashers, laundry appliances 50, water heaters, vacuum insulated structures 10, and other similar appliances 50 and fixtures within household and commercial settings.

The evacuation port assembly 92 is utilized to expel gas from the insulating cavity 16 to form the at least partial vacuum therein. The sensor assembly 20 is configured to sense a pressure within the insulating cavity 16 (e.g., an internal pressure) during the evacuation process, as well as monitor the pressure during the life of the structural wrapper 14. The structural wrapper 14 defines the sensor port 18, which is an opening into the insulating cavity 16 and is generally defined proximate to the evacuation port 90. The sensor assembly 20 is coupled to the outer surface 22 of the structural wrapper 14 and extends over the sensor port 18. Accordingly, the sensor assembly 20 is disposed outside of the insulating cavity 16, which may be advantageous for providing increased access to the sensor assembly 20.

With reference still to FIGS. 3 and 4, the sensor assembly 20 extends along the outer surface 22 of the structural wrapper 14. In the illustrated configuration, the sensor assembly 20 and the evacuation port assembly 92 extend in a same direction, which is generally parallel with a bottom edge of the structural wrapper 14. The sensor assembly 20 may extend through, adjacent to, about, or otherwise proximate to the evacuation port assembly 92.

In certain aspects, a port cover 100 is selectively coupled to the structural wrapper 14. The port cover 100 is generally an elongated feature that extends from the outer surface 22 of the door 12 to obscure the evacuation port assembly 92 from view. The port cover 100 is also configured to extend over the sensor assembly 20. The configuration of the sensor assembly 20 is sufficiently compact to fit under the port cover 100. In certain aspects, the sensor assembly 20 and the evacuation port assembly 92 extend a substantially similar distance from the outer surface 22 of the structural wrapper 14. The port cover 100 may be advantageous for concealing the evacuation port assembly 92 and the sensor assembly 20 from view, while selectively providing access to each.

Referring still to FIGS. 3 and 4, the sensor assembly 20 includes the connector 24, which has the base 26 coupled to the housing 28. The base 26 is generally a cylindrical shape configured to extend about the sensor port 18. The base 26 abuts and is coupled to the outer surface 22 of the structural wrapper 14.

The housing 28 is coupled to at least an outer surface 110 of the base 26. The housing 28 may also be coupled to a side surface 112 of the base 26. The housing 28 is an elongated structure that generally extends from a center area of the base 26 over an outer edge of the outer surface 110 of the base 26. A proximal end 114 of the housing 28 is coupled to the base 26, while a distal end 116 may be coupled to the base 26 or spaced from the base 26. Typically, the housing 28 is spaced from the outer surface 22 of the structural wrapper 14. The housing 28 generally has a frusto-conical, truncated pyramid, or rectangular prism shape The sensor assembly 20 includes the sensor pins 36 extending out of the housing 28 and through the plate 34. The sensor pins 36 may include or be coupled with electrical leads 132 and are configured to transmit sensed pressure information. The electrical leads 132 extend from the sensor pins 36 proximate the connector 24, proximate to the evacuation port assembly 92, and to a connection feature 134, which is illustrated adjacent to the servicing tube 96. The connection feature 134 may be utilized for connecting electronics to the sensor assembly 20, transmitting the sensed pressure information, or a combination thereof. The connection feature 134 may be coupled to the structural wrapper 14, coupled to the servicing tube 96, or otherwise retained in position relative to the structural wrapper 14. The connection feature 134 and/or electrical leads 132 may be selectively removable allowing for installation of the sensor pins 36.

With reference to FIGS. 5-9, the sensor assembly 20 includes the connector 24, the pressure sensor 32, the sensor pins 36, and the plate 34. In various aspects, the plate 34 includes an inner plate 140 coupled to an outer plate 142 via an adhesive layer 144. When the sensor assembly 20 is coupled to the structural wrapper 14, the pressure sensor 32 is configured to sense the pressure in the insulating cavity 16 via the fluid communication between the interior 30 of the connector 24 and the insulating cavity 16.

The base 26 defines a base interior 160, which is configured to align with the sensor port 18. The base 26 includes an outer wall 162 and an inner wall 164 spaced from one another. In the illustrated configuration, each of the outer wall 162 and the inner wall 164 form a circular shape to follow a perimeter 166 of the sensor port 18.

A receiving channel 168 is defined between the inner wall 164 and the outer wall 162. The inner wall 164 separates the receiving channel 168 from the base interior 160 (e.g., the base interior 160 is free of fluid communication with the receiving channel 168). Structural supports 170 extend between the outer wall 162 and the inner wall 164 to provide increased rigidity and strength through the connector 24. Additionally, support walls 172, 174 are coupled to the inner wall 164 and extend across the base interior 160. The support walls 172, 174 are arranged parallel to one another. The support walls 172, 174 may also provide additional rigidity and strength to the connector 24. The increased strength may be advantageous for when the interior 30 of the connector 24 is in fluid communication with the at least partial vacuum in the insulating cavity 16.

The inner wall 164 generally defines the base interior 160. The support walls 172, 174 may further narrow the base interior 160. For example, the support walls 172, 174 may narrow the portion of the base interior 160 in fluid communication with a housing interior 180 via a connecting channel 182 is generally defined between the two support walls 172, 174. It is contemplated that the base 26 may not include the support walls 172, 174. In such examples, the entirety of the base interior 160 may be in fluid communication with both the insulating cavity 16 and the housing interior 180.

With reference still to FIGS. 5-9, the housing 28 is coupled to the outer surface 110 and the side surface 112 of the base 26. In certain aspects, the proximal end 114 of the housing 28 is coupled to the outer surface 110 proximate to the center region of the base 26, and the distal end 116 is coupled to the side surface 112. The proximal end 114 of the housing 28 may have a lesser width and/or height than the distal end 116. Further, the housing interior 180 may have a lesser width and/or height at the proximal end 114 compared to the distal end 116. Accordingly, the housing 28 and the housing interior 180 each taper from the distal end 116 of the proximal end 114.

The distal end 116 is generally an open end of the housing 28 through which the pressure sensor 32 is installed and the sensor pins 36 extend. The inner and outer plates 140, 142 are positioned at the open distal end 116 to assist in sealing the housing 28 in an airtight manner. The distal end 116 of the housing 28 has a rim 190. A step 192 is defined between an outer portion 196 and an inner portion 198 of the rim 190, and a second step 194 is defined between the inner portion 198 and the remainder of the housing 28.

The rim 190 of the housing 28 defines a first recessed region 200 and a second recessed region 202. The second recessed region 202 is defined within the first recessed region 200 and, therefore, forms a deeper recess than the first recessed region 200. The recessed regions 200, 202 generally extend about an open center, which is an extension of the housing interior 180. The housing interior 180 extends through the distal end 116 of the housing 28, and the recesses formed by the recessed regions 200, 202 may be extensions of and in fluid communication with the remainder of the housing interior 180.

Figure 8:
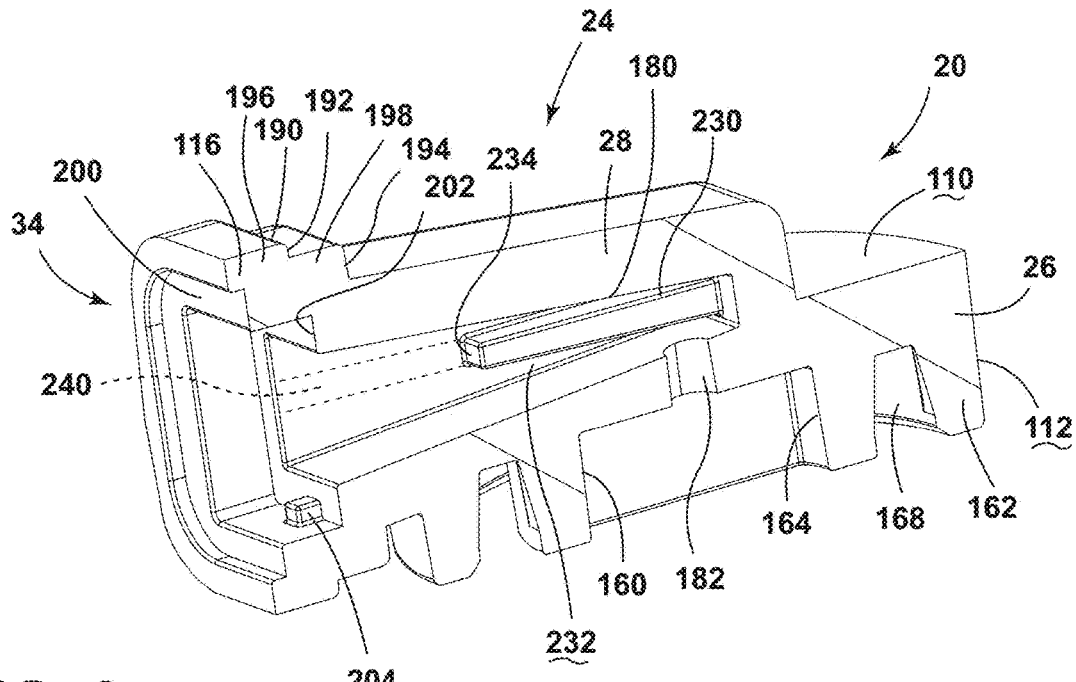
FIG. 8 is a perspective cross-sectional view of a connector for a sensor assembly, according to the present disclosure.

The recessed regions 200, 202 are configured to receive the inner and outer plates 140, 142 to seal the open distal end 116 of the housing 28. Additionally, the size and shape of the recessed regions 200, 202 correspond with the size and shape of the inner and outer plates 140, 142, respectively. The inner plate 140 is positioned to abut the second recessed region 202, while the outer plate 142 is positioned to abut the first recessed region 200. The housing 28 defines protrusions 204 extending from the second recessed region 202 and/or an interior surface 232. While a single protrusion 204 is illustrated in FIG. 8, it is contemplated that additional protrusions 204 may be defined by the housing 28. For example, a first portion of the connector 24 is illustrated in FIG. 8, and a second portion of the connector 24 may be a mirror image across a central axis 210 (illustrated in FIG. 5). The inner plate 140 defines notches 206 that correspond with the protrusions 204. The notches 206 receive the protrusions 204 to align the inner plate 140 with the housing 28. Additionally, the inner plate 140 defines inner apertures 212. The inner apertures 212 are generally arranged in a linear configuration. The sensor pins 36 extend through the inner apertures 212 to extend out of the housing 28.

Referring still to FIGS. 5-9, the outer plate 142 is positioned to abut the first recessed region 200. In configurations where the housing 28 increases in size from the proximal end 114 to the distal end 116, the outer plate 142 may be larger than the inner plate 140. The outer plate 142 defines outer apertures 214, which are configured to align with the inner apertures 212. Accordingly, the outer apertures 214 are generally arranged in a linear configuration. The sensor pins 36 extend through the inner apertures 212 and the outer apertures 214.

The inner plate 140 and the outer plate 142 are generally constructed of polymeric materials, such as plastic material. The inner and outer plates 140, 142 are constructed of a low permeable material to prevent fluid from entering the sensor assembly 20 when the interior of the connector 24 is under the at least partial vacuum when in fluid communication with the insulating cavity 16.

The outer plate 142 is spaced from the inner plate 140 by the adhesive layer 144. The adhesive layer 144 coupled the inner plate 140 to the connector 24, the inner plate 140 to the outer plate 142, and the outer plate 142 to the connector 24. The adhesive layer 144 generally extends between the inner and outer plates 140, 142, and may also extend around an outer edge 216 of the inner plate 140. The adhesive layer 144 also assists with sealing the housing interior 180 in an airtight manner. The adhesive layer 144 provides a seal around the inner plate 140. The adhesive layer 144 also seals the inner aperture and the outer apertures 214 around the sensor pins 36.

Referring still to FIGS. 5-9, the pressure sensor 32 is disposed within the housing interior 180. In various aspects, the pressure sensor 32 is configured as a microelectromechanical (MEMS) pressure sensor 32, which may be more efficient in cost and compact in size compared to mechanical sensors. The sensor assembly 20 includes various features that assist in retaining the pressure sensor 32 in the select position in the housing 28, particularly when the housing interior 180 is exposed to the at least partial vacuum, illustrated as arrow A in FIG. 9, of the insulating cavity 16. In the illustrated configuration, the pressure sensor 32 is disposed centrally within the housing interior 180, closer to the distal end 116 than the proximal end 114 of the housing 28.

In various aspects, the housing 28 defines ribs 230 extending along the interior surface 232 thereof. The ribs 230 extend from proximate the proximal end 114 toward the distal end 116. The pressure sensor 32 is configured to abut ends 234 of the ribs 230. The size of the pressure sensor 32 is generally larger than a space between the ribs 230, preventing the pressure sensor 32 from moving toward the proximal end 114 of the housing 28.

Additionally or alternatively, the inner plate 140 includes a projection 236 that extends into the housing interior 180 toward the pressure sensor 32. An end of the projection 236 is disposed adjacent to or abuts the pressure sensor 32. The projection 236 extends over a portion of the pressure sensor 32. The projection 236 is configured to prevent the sensor assembly 20 from moving further toward the distal end 116 of the housing 28.

With reference still to FIGS. 5-9, the tapering shape of the housing interior 180 from the distal end 116 to the proximal end 114 of the housing interior 180 also assists in preventing prevent movement of the pressure sensor 32. As the housing interior 180 tapers, the pressure sensor 32 is configured to abut the interior surface 232 of the housing 28, which minimizes or prevents movement further toward the proximal end 114 of the connector 24. It is contemplated that the housing 28 may have a more prism-like shape such that the height of the housing interior 180 at the distal end 116 and the proximal end 114 may be substantially similar. In such examples, the interior surface 232 of the housing 28 may define grooves 240 configured to slidably receive the pressure sensor 32 and assist in retaining the pressure sensor 32 in the selected position.

The position of the pressure sensor 32 is retained between the proximal end 114 and the distal end 116 at least by the ribs 230 and the projection 236 of the inner plate 140. The positioning of the pressure sensor 32 may be advantageous for sensing the pressure within the insulating cavity 16. Further, the positioning of the pressure sensor 32 may be advantageous for positioning the sensor pins 36 that extend through the inner and outer plates 140, 142. The sensor pins 36 are configured to be coupled to the pressure sensor 32 via clips 250 disposed adjacent to the projection 236 of the inner plate 140. The sensor pins 36 extend below the projection 236, through the inner apertures 212 defined in the inner plate 140, through the adhesive layer 144, and the outer apertures 214 defined in the outer plate 142. The position of the projection 236 relative to the clips 250 and the reduced movement of the pressure sensor 32 may assist in retaining the engagement between the clips 250 and the pressure sensor 32.

Referring still to FIGS. 5-9, when the sensor assembly 20 is coupled to the structural wrapper 14, the housing interior 180 is in fluid communication with the insulating cavity 16 via the connecting channel 182 and the base interior 160. Accordingly, the housing interior 180 is subject to the same or substantially same at least partial vacuum as the insulating cavity 16. The pressure sensor 32 disposed within the housing 28 is configured to sense the pressure within the insulating cavity 16 through this fluid communication between the connector 24 and the insulating cavity 16.

Figure 9:
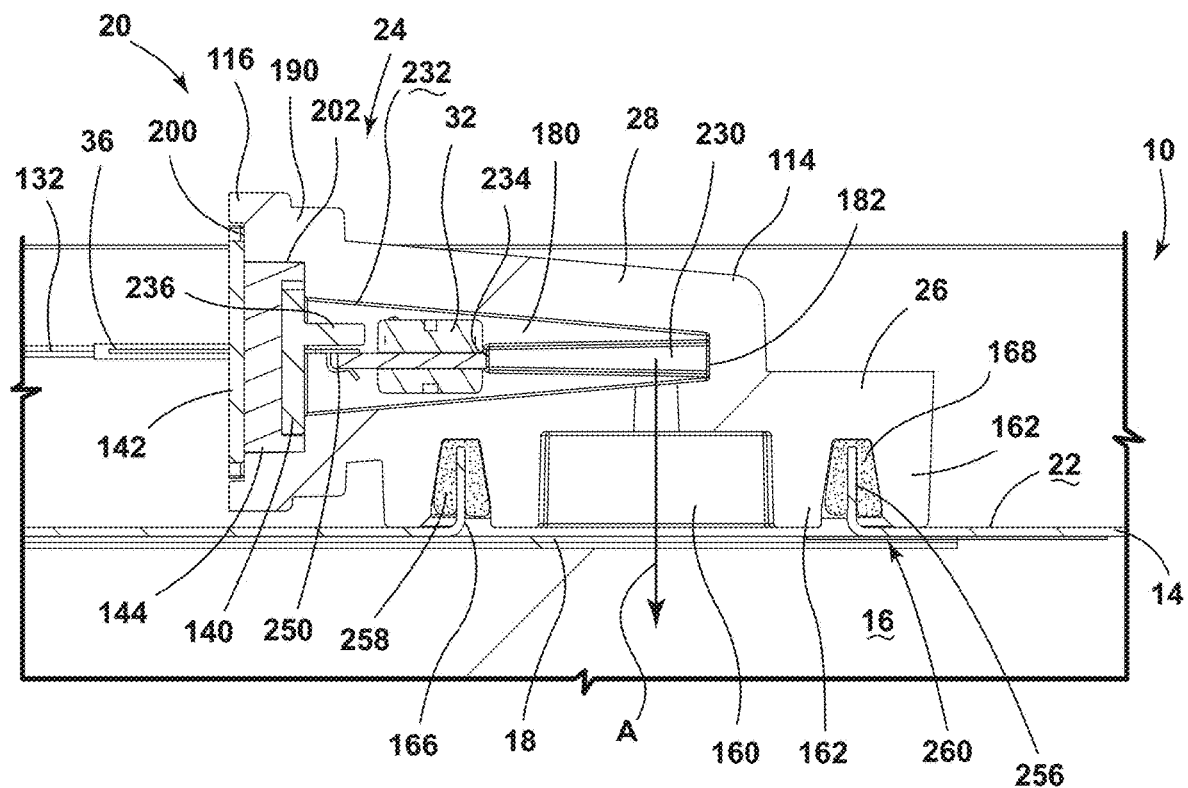
FIG. 9 is a cross-sectional view of a sensor assembly coupled to a structural wrapper via an adhered joint, according to the present disclosure.

As best illustrated in FIG. 9, the sensor assembly 20 is coupled to the outer surface 22 of the structural wrapper 14. The sensor assembly 20 is configured to extend over and about the sensor port 18, which generally operates to seal the insulating cavity 16 from a surrounding environment. The structural wrapper 14 includes a flange 256 that extends outward, away from the insulating cavity 16. Accordingly, the flange 256 protrudes or projects generally perpendicularly from the structural wrapper 14. The flange 256 is configured as a radial flange 256, which defines the sensor port 18.

The flange 256 is configured to be positioned within the receiving channel 168 of the base 26 of the sensor assembly 20. The outer wall 162 of the base 26 is positioned on or adjacent to the outer surface 22 of the structural wrapper 14 and extends about the flange 256. The inner wall 164 of the base 26 is on an opposing side of the flange 256 compared to the outer wall 162. The inner wall 164 is positioned over the sensor port 18 inside of the radial flange 256.

Referring still to FIG. 9, to couple the sensor assembly 20 to the structural wrapper 14, an adhesive 258 is disposed within the receiving channel 168 with the flange 256 to form an adhered joint 260. The flange 256 may be advantageous for positioning the sensor assembly 20 relative to the sensor port 18, as well as coupling the sensor assembly 20 to the structural wrapper 14. Once the sensor assembly 20 is coupled to the structural wrapper 14, the pressure sensor 32 is in fluid communication with the insulating cavity 16 to sense the pressure therein.

Figure 10:
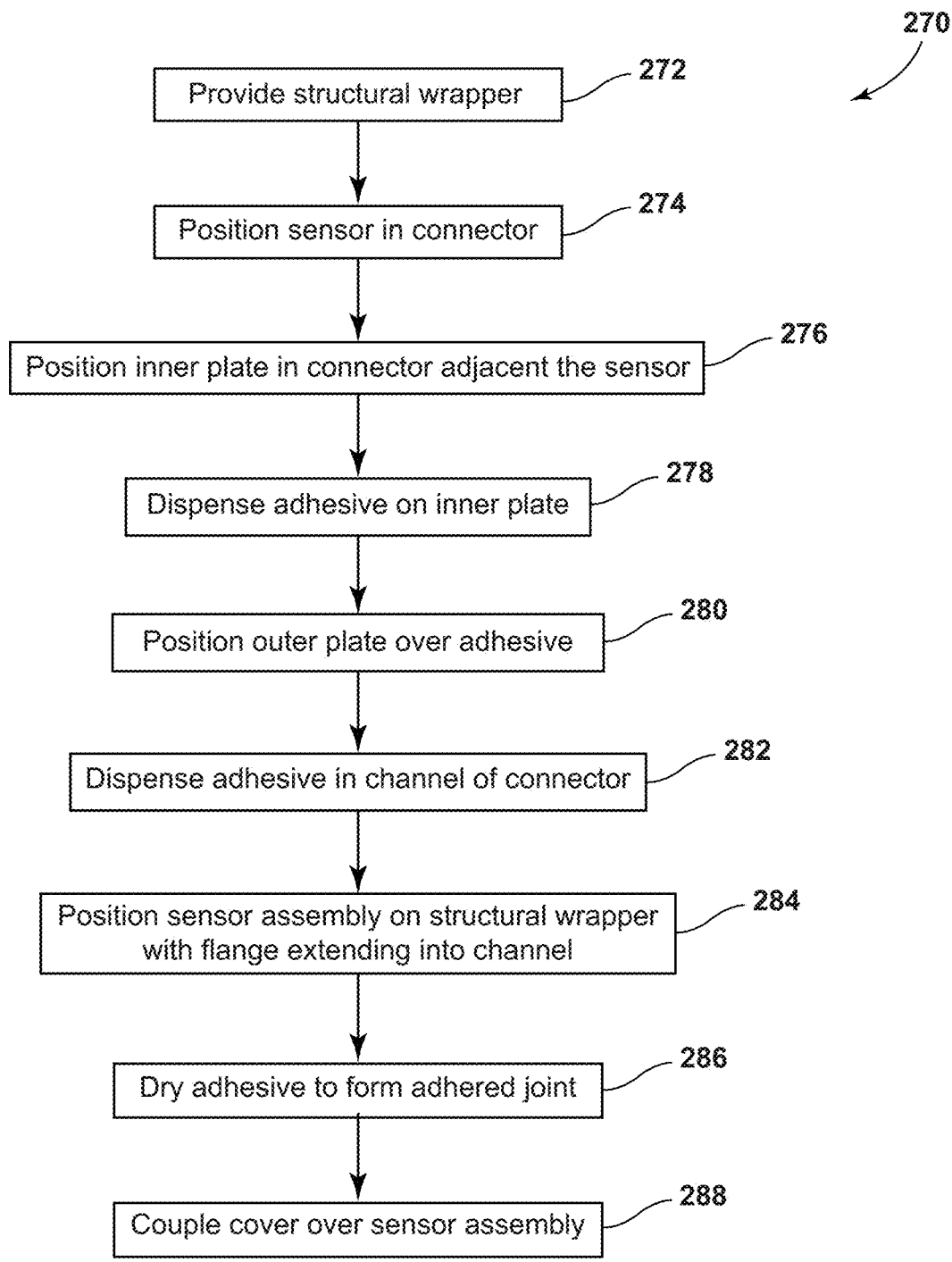
FIG. 10 is a flow diagram of a method for installing a sensor assembly on a structural wrapper, according to the present disclosure.
Figure 11:
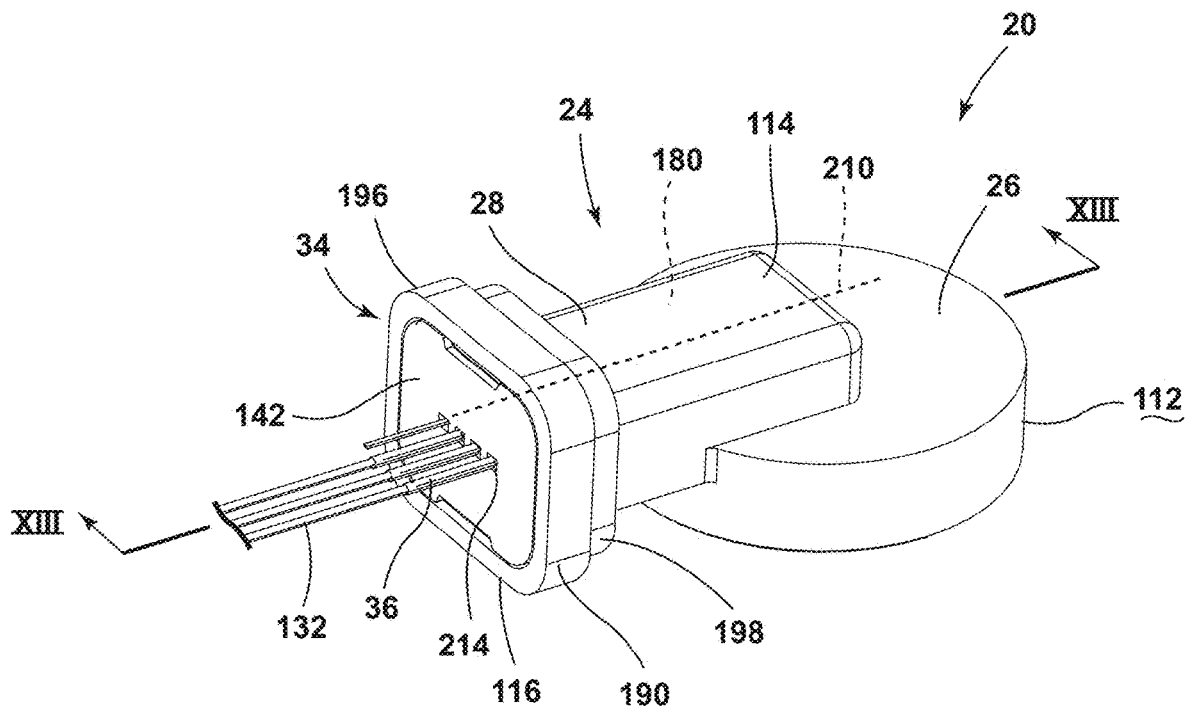
FIG. 11 is a partial side perspective view of a sensor assembly, according to the present disclosure.
Figure 12:
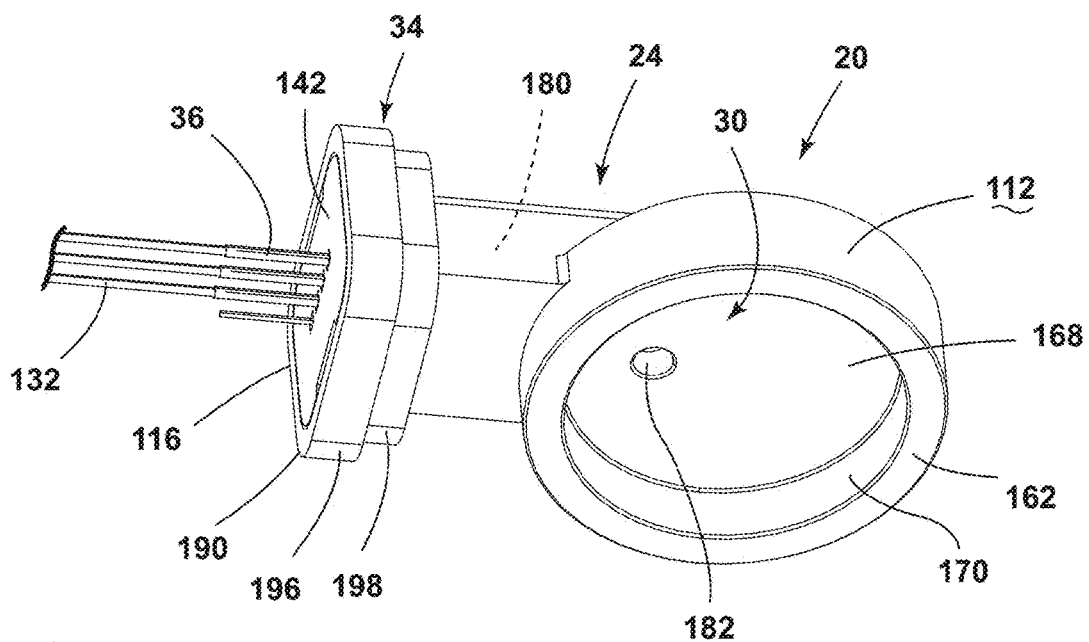
FIG. 12 is a partial bottom perspective view of a sensor assembly, according to the present disclosure.
Figure 13:
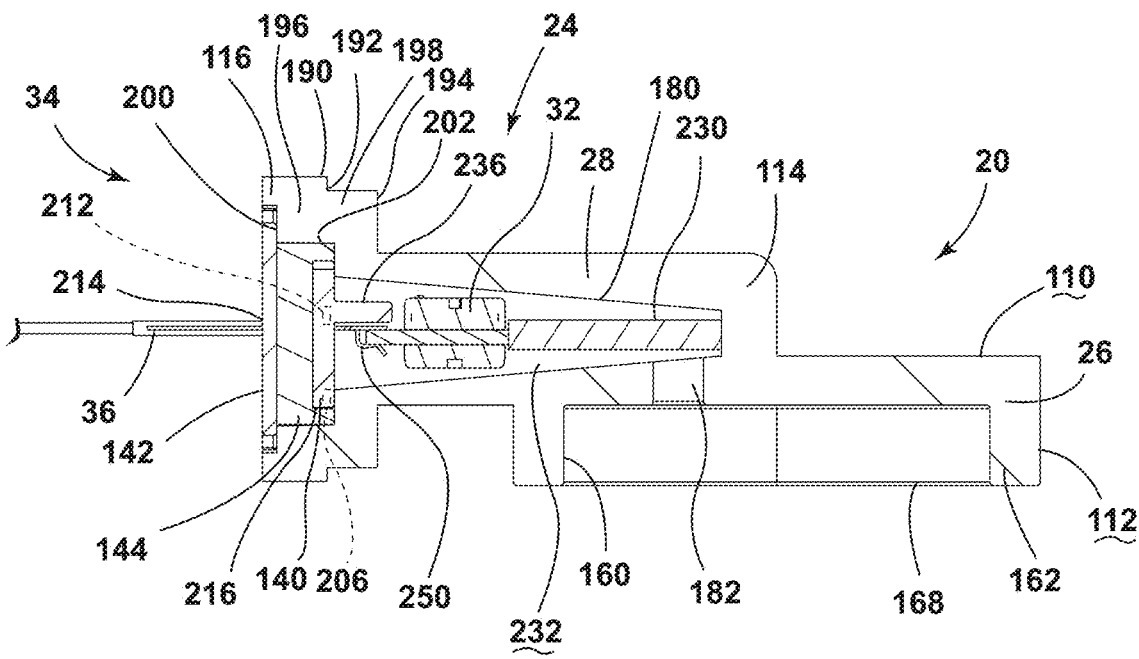
FIG. 13 is a cross-sectional view of the sensor assembly of FIG. 11, taken along lines XIII-XIII, according to the present disclosure.
Figure 14:
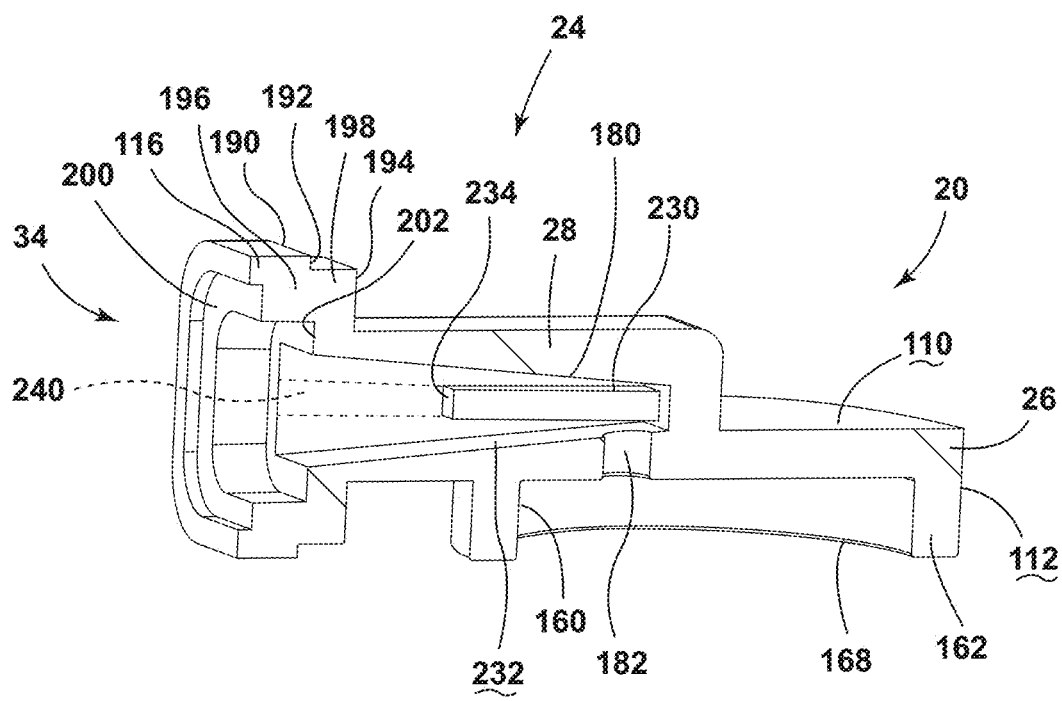
FIG. 14 is a perspective cross-sectional view of a connector for a sensor assembly, according to the present disclosure.

Referring to FIG. 10, as well as FIGS. 5-9, a method 270 of installing the sensor assembly 20 includes step 272 of providing the structural wrapper 14 for the selected vacuum insulated structure 10, such as the door 12, 52 or the cabinet 54. The structural wrapper 14 has the flange 256 that defines the sensor port 18. In step 274, the pressure sensor 32 is positioned within the housing 28 of the connector 24. The sensor pins 36 are coupled to the pressure sensor 32 via the clips 250.

In step 276, the inner plate 140 is positioned adjacent to the pressure sensor 32, abutting the second recessed region 202 of the connector 24. The projection 236 is configured to extend adjacent to or to abut the pressure sensor 32 to assist in retaining the pressure sensor 32 in position. The inner plate 140 is positioned such that the sensor pins 36 extend through the inner apertures 212.

In step 278, the adhesive layer 144 is formed by dispensing the adhesive 258 on the inner plate 140. The adhesive 258 seals the inner apertures 212 around the sensor pins 36, coupling the sensor pins 36 to the inner plate 140. The adhesive 258 also couples the inner plate 140 to the connector 24. The adhesive layer 144 extends across the inner plate 140 as well as around outer edges 216 of the inner plate 140 to the second recessed region 202. The adhesive layer 144 extending around the outer edges 216 of the inner plate 140 may also assist with sealing the open distal end 116 of the housing 28.

In step 280, the outer plate 142 is positioned adjacent to the adhesive layer 144 within the first recessed region 200 and is coupled to the connector 24. The outer plate 142 is positioned such that the sensor pins 36 extend through the outer apertures 214. The outer apertures 214 may be filled by the adhesive layer 144. In step 282, the adhesive layer 144 may be dried, cured, etc. to solidify the plates 140, 142 in position and the seal at the open distal end 116. Additionally, in step 282, additional portions of the electrical leads 132 and/or the connection feature 134 may be coupled to the sensor pins 36 that extend through the plates 140, 142.

In step 282, the adhesive 258 is dispensed into the receiving channel 168 defined in the base 26. The adhesive 258 is disposed between the inner wall 164 and the outer wall 162. In step 284, the sensor assembly 20 is positioned on the structural wrapper 14 with the flange 256 extending into the receiving channel 168. In this way, the sensor assembly 20 is moved to abut the structural wrapper 14 while the flange 256 extends into the adhesive 258 within the receiving channel 168. In step 286, the adhesive 258 may be cured, dried, etc. to secure the sensor assembly 20 to the structural wrapper 14. In step 288, the port cover 100 is coupled to the structural wrapper 14 over the sensor assembly 20.

It is understood that the steps 272-288 of the method 270 may be performed in any order, simultaneously, repeated, and/or omitted without departing the teachings herein. For example, it is contemplated that the pressure sensor 32, the sensor pins 36, and the plates 140, 142 may be assembled prior to the pressure sensor 32 being positioned within the housing 28.

Referring now to FIGS. 11-15, an additional or alternative configuration of each of the connector 24 for the sensor assembly 20 and the structural wrapper 14 is illustrated. In this example, the base 26 of the connector 24 includes the outer wall 162 and is free of the inner wall 164. Accordingly, the base interior 160 is defined by the outer wall 162. The entirety of the base interior 160 is in fluid communication with the housing interior 180 via the connecting channel 182.

The housing 28 is coupled to the base 26. The housing 28 may have a rectangular prism shape, such that the housing 28 does not substantially taper from the distal end 116 to the proximal end 114. The open distal end 116 of the housing 28 includes the rim 190 having the outer portion 196 and the inner portion 198 separated from one another via the step 192. The inner portion 198 is separated from the remainder of the housing 28 from the step 194, which is larger than the step 192 in this configuration.

The housing 28 may extend a further distance from the side surface 112 of the base 26 relative to the configuration of the connector 24 illustrated in FIGS. 5-9. The housing 28 is elongated and the rim 190 is spaced from the side surface 112 of the base 26. The rim 190 includes the first recessed region 200 and the second recessed region 202 to receive the inner and outer plates 140, 142.

Referring still to FIGS. 11-15, while the housing 28 in the illustrated configuration is substantially rectangular, the housing interior 180 tapers from the distal end 116 to the proximal end 114. The tapered housing interior 180 assists in retaining the pressure sensor 32 within the housing 28, along with the projection 236 of the inner plate 140 and the ribs 230. The configuration of the pressure sensor 32, the sensor pins 36, the plates 140, 142, and the adhesive layer 144 is substantially similar as described with respect to FIGS. 5-9.

Figure 15:
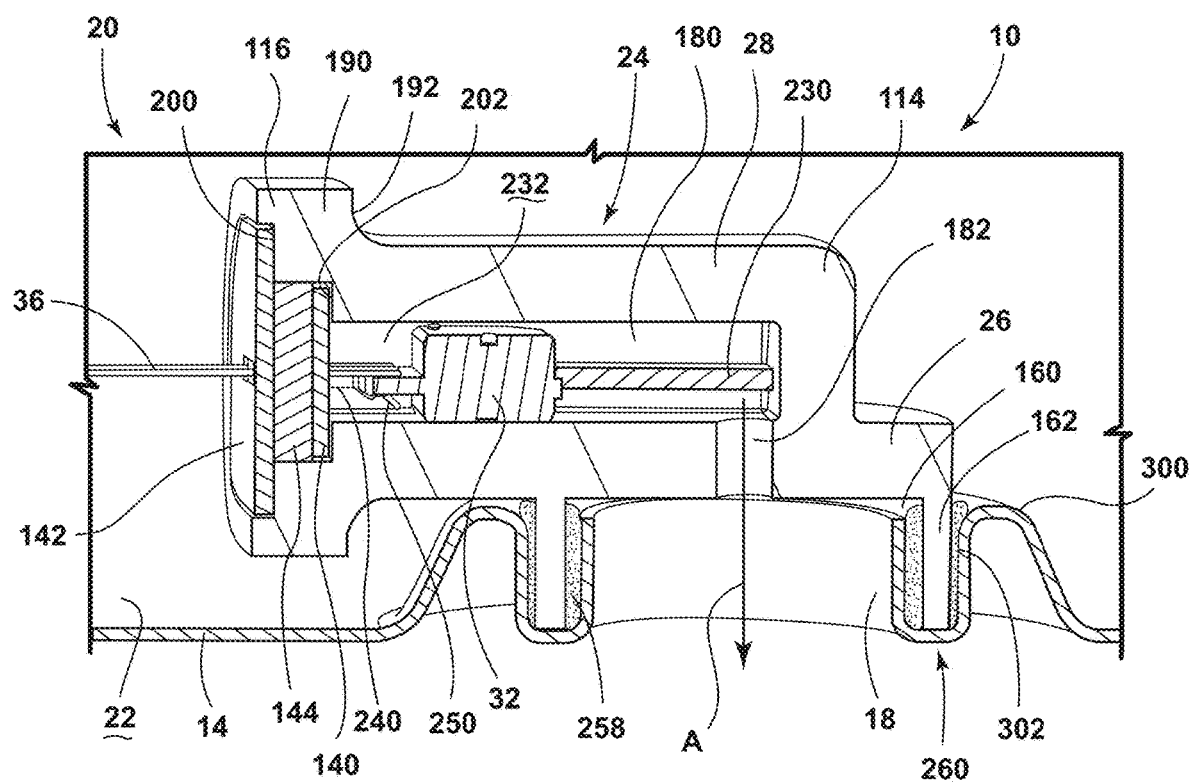
FIG. 15 is a cross-sectional view of a sensor assembly coupled to a structural wrapper via an adhered joint, according to the present disclosure.

As best illustrated in FIG. 15, the housing interior 180 may not taper but may be substantially the same height proximate to the proximate end 114 and the distal end 116. In such configurations, the interior surface 232 of the housing 28 defines the grooves 240 to slidably receive the pressure sensor 32. The grooves 240 and the ribs 230 extending from the interior surface 232 of the housing 28 are configured to retain the pressure sensor 32 in the selected position. Additionally or alternatively, the inner plate 140 may be free from the projection 236 and may be substantially planar. However, the inner plate 140 may include the projection 236 without departing from the teachings herein.

Further, as illustrated in FIG. 15, the sensor assembly 20 is coupled to the outer surface 22 of the structural wrapper 14 and extends over the sensor port 18. The structural wrapper 14 defines a protruding region 300 that extends outward, away from the insulating cavity 16. The protruding region 300 extends about the sensor port 18 with the sensor port 18 defined within the protruding region 300. A groove 302 is defined within the protruding region 300, which extends about the sensor port 18. In this way, the protruding region 300 is generally circular and the groove 302 is generally an annular groove. It is contemplated that the structural wrapper 14 may define the groove 302 around the sensor port 18 without the protruding region 300. In such examples, the groove 302 is a depressed region that extends into the insulating cavity 16 about the sensor port 18.

The groove 302 is configured to receive the base 26 of the connector 24. The base 26 is configured to extend over the sensor port 18 to place the base interior 160 in fluid communication with the insulating cavity 16. When the outer wall 162 is positioned within the groove 302, the connecting channel 182 is disposed adjacent to the sensor port 18. The elongated configuration of the housing 28 extending a greater distance from the side surface 112 of the base 26 provides a space between the housing 28 and the base 26 to receive the protruding region 300 of the structural wrapper 14. Accordingly, the configuration of the connector 24 does not interfere with the protruding region 300 and vice versa.

The adhesive 258 is dispensed into the groove 302 and the outer wall 162 of the base 26 is positioned in the groove 302 to form the adhered joint 260 and couple the sensor assembly 20 to the structural wrapper 14. An end of the base 26 positioned in the groove 302 may generally align with the outer surface 22 of the structural wrapper 14 in an area surrounding the protruding region 300. In this way, the connector 24 may not extend too far from the outer surface 22 in a way that would interfere with the port cover 100 (FIG. 2).

Figure 16:
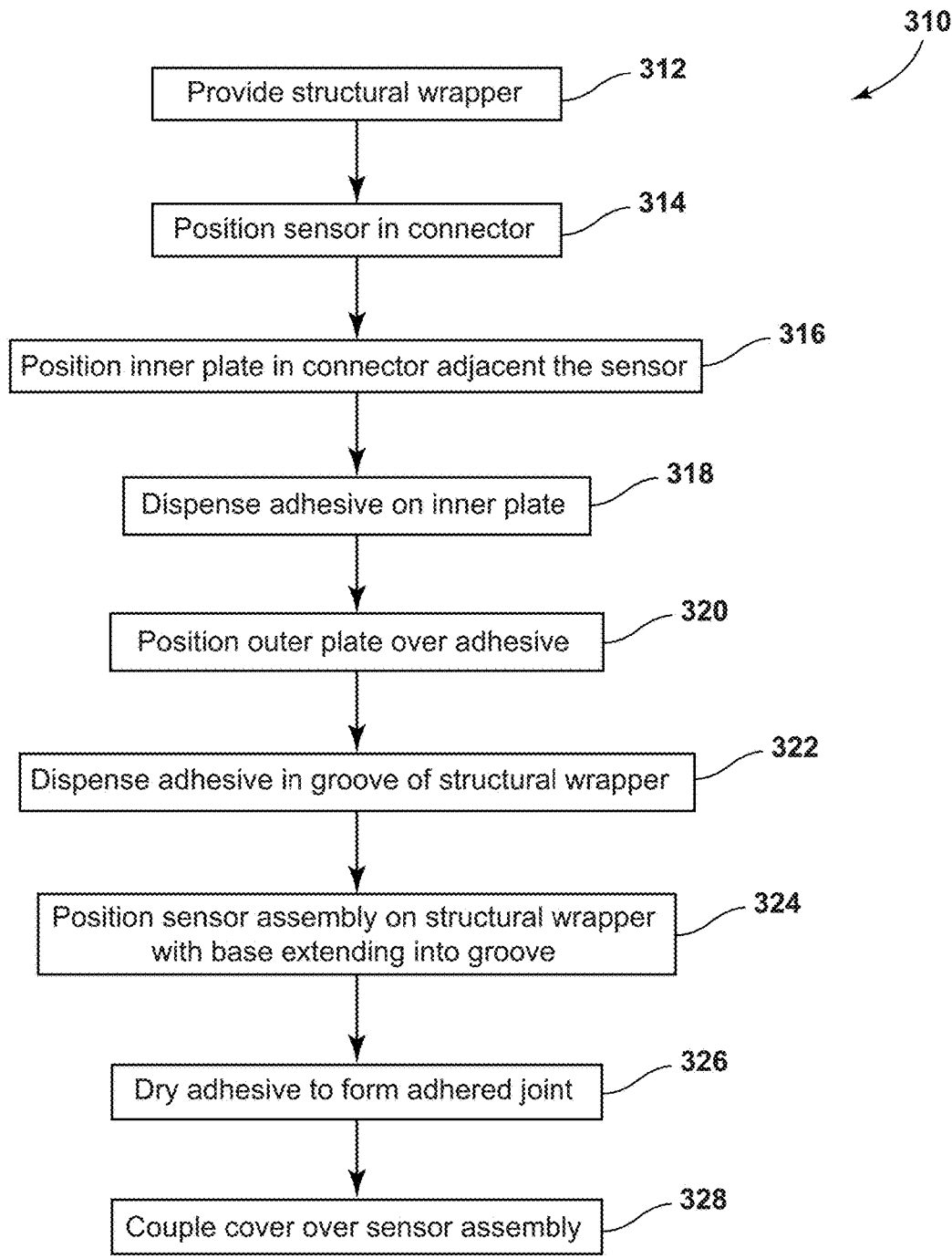
FIG. 16 is a flow diagram of a method for installing a sensor assembly on a structural wrapper, according to the present disclosure.

Referring to FIG. 16, as well as FIGS. 11-15, a method 310 for installing the sensor assembly 20 includes step 312 of providing the structural wrapper 14. The structural wrapper 14 defines the groove 302 extending about the sensor port 18. In step 314, the pressure sensor 32 is positioned in the connector 24. The pressure sensor 32 is positioned within the housing 28 adjacent to or abutting the ribs 230. The pressure sensor 32 is moved through the open distal end 116 into the housing interior 180. In various aspects, the configuration of the open distal end 116 of the housing 28 facilitates the positioning of the pressure sensor 32 into the housing 28. In examples with the grooves 240, the pressure sensor 32 may be slidably received by the grooves 240 to assist in retaining the pressure sensor 32 in the selected position. Additionally, in step 316, the sensor pins 36 may be coupled to the pressure sensor 32 via the clips 250. The sensor pins 36 extend from the pressure sensor 32 and through the open distal end 116 of the housing 28.

In step 316, the inner plate 140 is positioned in the connector 24 adjacent to the pressure sensor 32. The inner plate 140 is positioned in the second recessed region 202 at the open distal end 116 of the housing 28. The sensor pins 36 extend through the inner apertures 212. In step 318, the adhesive 258 for the adhesive layer 144 is dispensed on the inner plate 140, sealing the open distal end 116 of the housing 28 and the inner apertures 212 around the sensor pins 36. The adhesive layer 144 also couples the inner plate 140 to the housing 28.

In step 320, the outer plate 142 is positioned adjacent to the adhesive layer 144, coupling the outer plate 142 to the housing 28. The outer plate 142 is positioned such that the sensor pins 36 extend through the outer apertures 214. Additionally, the electrical leads 132 and the connection feature 134 may be coupled to the sensor pins 36 proximate to the outer plate 142 outside of the housing 28.

In step 322, the adhesive 258 is dispensed in the groove 302 of the structural wrapper 14. In step 324, the sensor assembly 20 is positioned on the structural wrapper 14 with the base 26 extending into the groove 302. In this way, the sensor assembly 20 extends over the sensor port 18 and the outer wall 162 of the base 26 extends into the adhesive 258 in the groove 302, forming the adhered joint 260 and coupling the sensor assembly 20 to the structural wrapper 14. In step 236, the adhesive 258 is dried, cured, etc. to solidify the adhered joint 260. In step 328, the port cover 100 is coupled to the structural wrapper 14 over the sensor assembly 20.

It is understood that the steps 312-328 of the method 310 may be performed in any order, simultaneously, repeated, and/or omitted without departing the teachings herein. For example, it is contemplated that the pressure sensor 32, the sensor pins 36, and the plates 140, 142 may be assembled prior to the pressure sensor 32 being positioned within the housing 28.

With reference to FIGS. 1-16, each configuration of the sensor assembly 20 disclosed herein is configured to seal the sensor port 18 from the surrounding environment and provide the pressure sensor 32 to sense the pressure within the insulating cavity 16 of the structural wrapper 14. The pressure sensor 32 is generally configured as the MEMS pressure sensor 32, which is compact in size. The connector 24 is generally constructed of a polymeric material, such as a plastic material. Accordingly, the connector 24 may be manufactured through an injection molding process.

The sensor assembly 20 is coupled to the structural wrapper 14 via the adhered joint 260 between the base 26 and the structural wrapper 14. In certain aspects, as illustrated in FIGS. 5-9, the base 26 defines the receiving channel 168, which receives the adhesive 258 and the flange 256 of the structural wrapper 14. In additional examples, as illustrated in FIGS. 11-15, the structural wrapper 14 defines the groove 302, which receives the adhesive 258 and the outer wall 162 of the base 26. Each configuration of the sensor assembly 20 may be compact, extending substantially similar distances from the outer surface 22 of the structural wrapper 14 in the area surrounding the sensor port 18 (outside the protruding region 300 in examples where the structural wrapper 14 defines the protruding region 300). Accordingly, the protruding region 300 with the groove 302 and the flange 256 each extend about a same distance from the surrounding area of the structural wrapper 14.

The structural wrapper 14 is manufactured to form the selected vacuum insulated structure 10. The structural wrapper 14 is filled with insulation materials 64, which may be inserted through, for example, the evacuation port 90 of the structural wrapper 14. The sensor assembly 20 is coupled to the structural wrapper 14 over the sensor port 18, which also seals the sensor port 18 to the surrounding environment. The evacuation port assembly 92 is coupled to the structural wrapper 14 over the evacuation port 90. Fluid may be evacuated from the insulating cavity 16 via the evacuation port assembly 92 to define the at least partial vacuum within the insulating cavity 16.

Referring still to FIGS. 1-16, the pressure sensor 32 is in fluid communication with the insulating cavity 16 to sense the pressure therein. The sensor assembly 20 is configured to sense the pressure during and after the evacuation process. This may be advantageous for providing the select pressure in the insulating cavity 16 during the evacuation process, as well as maintaining the pressure within the insulating cavity 16 over time. This may also allow the pressure within the insulating cavity 16 to be continually monitored. Further, the pressure may be adjusted via the evacuation port assembly 92 in response to the pressure sensed by the pressure sensor 32.

The sensor assembly 20 is disposed on the outer surface 22 of the structural wrapper 14, outside of the insulating cavity 16, which may be advantageous for providing increased access to the sensor assembly 20. The port cover 100 is configured to selectively couple to the outer surface 22 of the structural wrapper 14 over both the sensor assembly 20 and the evacuation port assembly 92. The sensor assembly 20 is sufficiently compact to extend a similar distance from the outer wrapper 56 as the evacuation port assembly 92, allowing the same port cover 100 to extend over both the sensor assembly 20 and evacuation port assembly 92 to conceal both from view.

Use of the present device may provide for a variety of advantages. For example, the sensor assembly 20 may be disposed outside of the insulating cavity 16. Additionally, the sensor assembly 20 senses the pressure within the insulating cavity 16 during the evacuation process and monitors the vacuum pressure during product operation, which may increase the longevity of the vacuum insulated structure 10. The arrangement of the sensor assembly 20 relative to the sensor port 18 enables the sensing, testing, and/or monitoring of a pressure within the insulating cavity 16 of the vacuum insulated structure 10 in a manner that does not break a seal of the vacuum insulated structure 10. Further, the pressure sensor 32 may be the MEMS pressure sensor 32, which may be more efficient in manufacturing processes. Further, the connector 24 may be formed via the injection molding process, which may increase efficiency of the manufacturing process. Also, the connector 24 may be adhered to the structural wrapper 14 coupling the sensor assembly 20 to the structural wrapper 14. Further, the sensor assembly 20 may be sized and shaped to be positioned below the port cover 100. Moreover, the sensor assembly 20 may be utilized with any practicable configuration of the vacuum insulated structure 10. Additional benefits or advantages may be realized and/or achieved.

The device disclosed herein is further summarized in the following paragraphs and is further characterized by combinations of any and all of the various aspects described therein.

According to another aspect of the present disclosure, a door assembly includes a structural wrapper defining an insulating cavity. The structural wrapper defines a sensor port. A sensor assembly is coupled to an outer surface of the structural wrapper proximate to the sensor port. The sensor assembly includes a connector having a base coupled to a housing. The base is coupled to the structural wrapper. The connector defines an interior in fluid communication with the insulating cavity. A pressure sensor is disposed within the housing. The pressure sensor is configured to sense a pressure within the insulating cavity. At least one plate is disposed at an open end of the housing. The pressure sensor includes a sensor pin that extends through the at least one plate.

According to another aspect, a structural wrapper includes a flange that defines a sensor port. A base defines a channel for receiving the flange.

According to another aspect, an adhesive is disposed within a channel with a flange to couple a sensor assembly to a structural wrapper.

According to another aspect, a structural wrapper defines a groove extending about a sensor port.

According to another aspect, a base includes an outer wall disposed within a groove of a structural wrapper.

According to another aspect, a structural wrapper defines a protruding region extending about a sensor port. The groove is defined in the protruding region.

According to another aspect, a pressure sensor is a microelectromechanical pressure sensor.

According to another aspect, at least one plate includes a first plate coupled to a second plate via an adhesive layer to seal an open end of a housing.

According to another aspect, a connector includes ribs extending along an interior surface of a housing. A pressure sensor is configured to abut ends of the ribs.

According to another aspect, a vacuum insulated structure includes a structural wrapper defining an insulating cavity. The structural wrapper defines a sensor port in fluid communication with the insulating cavity. A sensor assembly is coupled to the structural wrapper. The sensor assembly extends over the sensor port. The sensor assembly includes a connector having a base coupled to the structural wrapper and a housing coupled to the base. An interior of the connector is in fluid communication with the insulating cavity via the sensor port. A pressure sensor is disposed within the housing. The pressure sensor is configured to sense a pressure within the insulating cavity.

According to another aspect, a structural wrapper includes a flange that defines a sensor port. The flange protrudes from the structural wrapper.

According to another aspect, a base defines a channel configured to receive a flange of a structural wrapper to couple a sensor assembly to the structural wrapper.

According to another aspect, a port cover is coupled to a structural wrapper. The structural wrapper defines an evacuation port proximate to a sensor port. The port cover extends over the sensor port, the sensor assembly, and the evacuation port.

According to another aspect, a structural wrapper defines a groove extending about a sensor port.

According to another aspect, a groove is defined in a protruding region of a structural wrapper. The protruding region extends about a sensor port.

According to another aspect, a base includes an outer wall disposed within a groove of a structural wrapper.

According to yet another aspect, a sensor assembly for a vacuum insulated structure includes a base defining a base interior. A housing defines a housing interior. The housing is coupled to the base. The base interior is in fluid communication with the housing interior via a connecting channel. A plate is coupled to an open end of the housing. A pressure sensor is disposed within the housing interior. The pressure sensor is configured to sense a pressure within said vacuum insulated structure.

According to another aspect, a pressure sensor is a microelectromechanical pressure sensor.

According to another aspect, a microelectromechanical pressure sensor includes a sensor pin extending through a plate and out of a housing interior.

According to another aspect, a base defines a receiving channel between an outer wall and an inner wall.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A door assembly, comprising:
    a structural wrapper defining an insulating cavity, wherein the structural wrapper defines a sensor port; and
    a sensor assembly coupled to an outer surface of the structural wrapper proximate to the sensor port, wherein the sensor assembly includes:
        a connector having a base coupled to a housing, wherein the base is coupled to the structural wrapper, and wherein the connector defines an interior in fluid communication with the insulating cavity;
        a pressure sensor disposed within the housing, wherein the pressure sensor is configured to sense a pressure within the insulating cavity; and
        at least one plate disposed at an open end of the housing, wherein the pressure sensor includes a sensor pin that extends through the at least one plate.

2. The door assembly of claim 1, wherein the structural wrapper includes a flange that defines the sensor port, and wherein the base defines a channel for receiving the flange.

3. The door assembly of claim 2, further comprising:
    an adhesive disposed within the channel with the flange to couple the sensor assembly to the structural wrapper.

4. The door assembly of claim 1, wherein the structural wrapper defines a groove extending about the sensor port.

5. The door assembly of claim 4, wherein the base includes an outer wall disposed within the groove of the structural wrapper.

6. The door assembly of claim 4, wherein the structural wrapper defines a protruding region extending about the sensor port, and wherein the groove is defined in the protruding region.

7. The door assembly of claim 1, wherein the pressure sensor is a microelectromechanical pressure sensor.

8. The door assembly of claim 1, wherein the at least one plate includes a first plate coupled to a second plate via an adhesive layer to seal the open end of the housing.

9. The door assembly of claim 1, wherein the connector includes ribs extending along an interior surface of the housing, wherein the pressure sensor is configured to abut ends of the ribs.

10. A vacuum insulated structure, comprising:
    a structural wrapper defining an insulating cavity, wherein the structural wrapper defines a sensor port in fluid communication with the insulating cavity;
    a sensor assembly coupled to the structural wrapper, wherein the sensor assembly extends over the sensor port, and wherein the sensor assembly includes:
        a connector having a base coupled to the structural wrapper and a housing coupled to the base, wherein an interior of the connector is in fluid communication with the insulating cavity via the sensor port; and
        a pressure sensor disposed within the housing, wherein the pressure sensor is configured to sense a pressure within the insulating cavity; and
    a port cover coupled to the structural wrapper, wherein the structural wrapper defines an evacuation port proximate to the sensor port, and wherein the port cover extends over the sensor port, the sensor assembly, and the evacuation port.

11. The vacuum insulated structure of claim 10, wherein the structural wrapper includes a flange that defines the sensor port, wherein the flange protrudes from the structural wrapper.

12. The vacuum insulated structure of claim 11, wherein the base defines a channel configured to receive the flange of the structural wrapper to couple the sensor assembly to the structural wrapper.

13. The vacuum insulated structure of claim 10, wherein the structural wrapper defines a groove extending about the sensor port.

14. The vacuum insulated structure of claim 13, wherein the groove is defined in a protruding region of the structural wrapper, wherein the protruding region extends about the sensor port.

15. The vacuum insulated structure of claim 13, wherein the base includes an outer wall disposed within the groove of the structural wrapper.

16. The door assembly of claim 1, further comprising:
    a port cover coupled to the structural wrapper, wherein the port cover extends over the sensor port and the sensor assembly.

17. The door assembly of claim 16, wherein the structural wrapper defines an evacuation port proximate to the sensor port, and wherein the port cover extends over the evacuation port.

18. The vacuum insulated structure of claim 10, wherein the pressure sensor is a microelectromechanical pressure sensor.

19. A vacuum insulated structure, comprising:
a structural wrapper defining an insulating cavity, wherein the structural wrapper defines a sensor port in fluid communication with the insulating cavity, and wherein the structural wrapper includes a flange that defines the sensor port, and further wherein the flange protrudes from the structural wrapper; and
a sensor assembly coupled to the structural wrapper, wherein the sensor assembly extends over the sensor port, and wherein the sensor assembly includes:
   a connector having a base coupled to the structural wrapper and a housing coupled to the base, wherein an interior of the connector is in fluid communication with the insulating cavity via the sensor port; and
   a pressure sensor disposed within the housing, wherein the pressure sensor is configured to sense a pressure within the insulating cavity.

20. The vacuum insulated structure of claim 19, wherein the base defines a channel configured to receive the flange of the structural wrapper to couple the sensor assembly to the structural wrapper.

\* \* \* \* \*